United States Patent
Deng et al.

(10) Patent No.: US 9,674,085 B2
(45) Date of Patent: Jun. 6, 2017

(54) METHOD AND DEVICE FOR HANDLING INCONSISTENCY OF PSC STATES BETWEEN TWO ENDS

(71) Applicants: TELEFONAKTIEBOLAGET L M ERICSSON (PUBL), Stockholm (SE); Jun Deng, Beijing (CN)

(72) Inventors: Jun Deng, Beijing (CN); Lei Chen, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/654,962

(22) PCT Filed: Jan. 8, 2013

(86) PCT No.: PCT/CN2013/070195
§ 371 (c)(1),
(2) Date: Jun. 23, 2015

(87) PCT Pub. No.: WO2014/107834
PCT Pub. Date: Jul. 17, 2014

(65) Prior Publication Data
US 2015/0334013 A1 Nov. 19, 2015

(51) Int. Cl.
*H04L 12/721* (2013.01)
*H04L 12/26* (2006.01)
(Continued)

(52) U.S. Cl.
CPC .......... *H04L 45/70* (2013.01); *H04L 41/0672* (2013.01); *H04L 41/0816* (2013.01);
(Continued)

(58) Field of Classification Search
CPC ......... H04L 45/22; H04L 45/28; H04L 45/50; H04L 12/6418; H04L 41/0654
See application file for complete search history.

(56) References Cited

U.S. PATENT DOCUMENTS

| | | | | |
|---|---|---|---|---|
| 2012/0127855 A1* | 5/2012 | Alon | ............. | H04L 12/413 370/218 |
| 2012/0182861 A1* | 7/2012 | Ma | ............. | H04L 41/06 370/217 |

(Continued)

FOREIGN PATENT DOCUMENTS

| | | |
|---|---|---|
| CN | 102223302 A | 10/2011 |
| EP | 1229677 A2 | 8/2002 |
| WO | 2011095101 A1 | 8/2011 |

OTHER PUBLICATIONS

International Search Report and Written Opinion for International Application No. PCT/CN2013/070195, mailed Oct. 17, 2013, 12 pages.

(Continued)

*Primary Examiner* — Jung Park
(74) *Attorney, Agent, or Firm* — Nicholson De Vos Webster & Elloitt LLP

(57) ABSTRACT

The present invention discloses a method and an associated networking device for eliminating inconsistency of PSC states between two ends of a communication tunnel. The method comprises the steps of: receiving a PSC message from another networking device (S410); detecting a local PSC state of the networking device (S420); determining whether the received PSC message is an NR message and the detected local PSC state is a DNR state (S430); and changing the local PSC state from the DNR state to a Normal state (S440), if it is determined that the received PSC message is an NR message and the detected local PSC state is a DNR state.

18 Claims, 5 Drawing Sheets

(51) Int. Cl.
*H04L 29/14* (2006.01)
*H04L 12/24* (2006.01)
*H04L 12/707* (2013.01)
*H04L 12/703* (2013.01)
*H04L 12/723* (2013.01)

(52) U.S. Cl.
CPC .............. *H04L 43/08* (2013.01); *H04L 45/22* (2013.01); *H04L 45/28* (2013.01); *H04L 69/40* (2013.01); *H04L 45/50* (2013.01)

(56) References Cited

U.S. PATENT DOCUMENTS

2013/0003528 A1* 1/2013 Wu ..................... H04L 41/0816
370/220
2014/0254353 A1* 9/2014 Ye ........................... H04L 45/22
370/228

OTHER PUBLICATIONS

Weingarten et al., "MPLS Transport Profile (MPLS-TP) Linear Protection," Internet Engineering Task Force, Request for Comments: 6378, Oct. 2011, pp. 1-53.
International Preliminary Report on Patentability for International Application No. PCT/CN2013/070195, mailed Jul. 23, 2015, 7 pages.
Supplementary European Search Report and Written Opinion for Application No. EP 13 871 074.4, mailed Jul. 4, 2016, 6 pages.
"Ethernet linear protection switching; G.8031/Y.1342 (Jun. 2011)", ITU-T Standard, International Telecommunication Union, Jun. 22, 2011, pp. 1-94.

* cited by examiner

METHOD AND DEVICE FOR HANDLING INCONSISTENCY OF PSC STATES BETWEEN TWO ENDS

CROSS-REFERENCE TO RELATED APPLICATIONS

This application is a National stage of International Application No. PCT/CN2013/070195, filed Jan. 8, 2013, which is hereby incorporated by reference.

FIELD OF THE INVENTION

The present invention generally relates to the technical field of network systems, and particularly, to a method and a networking device for handling inconsistency of Protection State Coordination (PSC) states between two ends.

BACKGROUND OF THE INVENTION

For network survivability, a protection path, in addition to a working path, is usually reserved for traffic transmission between two ends of a communication tunnel, as shown in FIG. 1. In case of a breakdown of the working path, both ends (denoted as nodes A and B in FIG. 1) switch the traffic from the working path to the protection path, so that the traffic transmission between nodes A and B can keep going.

In such a deployment as shown in FIG. 1, a certain mechanism is required to coordinate protection states between two ends of the tunnel. To fulfill this requirement in Multi-Protocol Label Switching Transport Profile (MPLS-TP) networks, a solution based on PSC state machine is given in [1]. According to that solution, for 1:1 linear protection of a MPLS-TP tunnel, the PSC state machine operating on one end of the tunnel will ignore a remote No Request (NR) message from the other end of the tunnel if the local PSC state is Do-not-Revert (DNR), and will ignore a remote DNR message if the local PSC state is Normal. Traffic from the end in a Normal state will be transmitted on the working path, whereas traffic from the end in a DNR state will be transmitted on the protection path.

In some scenarios, however, even if the PSC state machine based solution is adopted, inconsistency of PSC states between two ends of a communication tunnel cannot be avoided or eliminated. Considering for example a scenario where both the working path and the protection path went down but revive simultaneously, due to independent negotiations for recovery of the working and protection paths, there will be a possibility that node A has the working path recovered first whereas node B has the protection path recovered first, and vice versa. As a result, if the PSC domain consisting of both ends and both paths is configured by the operator not to automatically revert to the Normal state, node A will enter the Normal state and transmits traffic on the working path whereas node B will enter the DNR state and transmits traffic on the protection path, and vice versa.

SUMMARY OF THE INVENTION

In view of the foregoing, there is needed a technique for handling the inconsistency of PSC states between two ends of a communication tunnel.

According to a first aspect of the invention, there is provided a networking device, comprising a transceiver, a state detecting unit, an inconsistency identifying unit and an inconsistency removing unit. The transceiver is configured to receive a PSC message from another networking device. The state detecting unit is configured to detect a local PSC state of the networking device. The inconsistency identifying unit is configured to determine whether the received PSC message is an NR message and the detected local PSC state is a DNR state. The inconsistency removing unit is configured to change the local PSC state from the DNR state to a Normal state, if the inconsistency identifying unit determines that the received PSC message is an NR message and the detected local PSC state is a DNR state.

According to a second aspect of the invention, there is provided a method for use in a networking device. The method comprises the steps of: receiving a PSC message from another networking device; detecting a local PSC state of the networking device; determining whether the received PSC message is an NR message and the detected local PSC state is a DNR state; and changing the local PSC state from the DNR state to a Normal state, if it is determined that the received PSC message is an NR message and the detected local PSC state is a DNR state.

By using the networking device and the method according to the first and second aspects of the present invention, any inconsistency of PSC states between two ends of a communication tunnel can be identified and removed.

BRIEF DESCRIPTION OF THE DRAWINGS

The above and other objects, features, and advantages of the present invention will become apparent from the following descriptions on embodiments of the present invention with reference to the drawings, in which.

DETAILED DESCRIPTION OF THE PREFERRED EMBODIMENTS

Hereinafter, the present invention is described with reference to embodiments shown in the attached drawings. However, it is to be understood that those descriptions are just provided for illustrative purpose, rather than limiting the present invention. Further, in the following, descriptions of known structures and techniques are omitted so as not to unnecessarily obscure the concept of the present invention.

As will be appreciated by those skilled in the art, the present invention is not limited to be applied for the unexpected scenario described in the background, but can be applied for any other scenario where an inconsistency of PSC states between two ends of a communication tunnel may occur. Further, it will be appreciated that the present invention is not limited to be applied to MPLS-TP networks described by way of example, but can be applied to any other network where protection path is reserved for traffic transmission between two ends of a communication tunnel as shown in FIG. 1.

Figure 1:
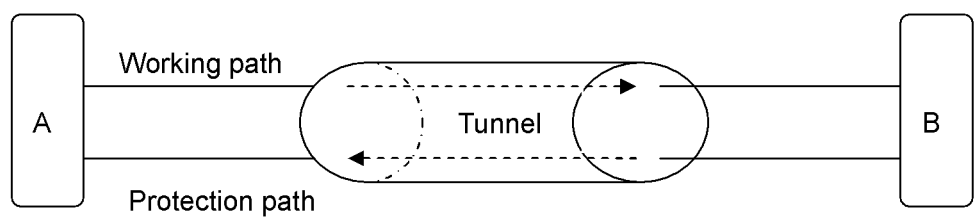
FIG. 1 is a diagram schematically illustrating an example of a deployment where the present invention may be applied.
Figure 2:
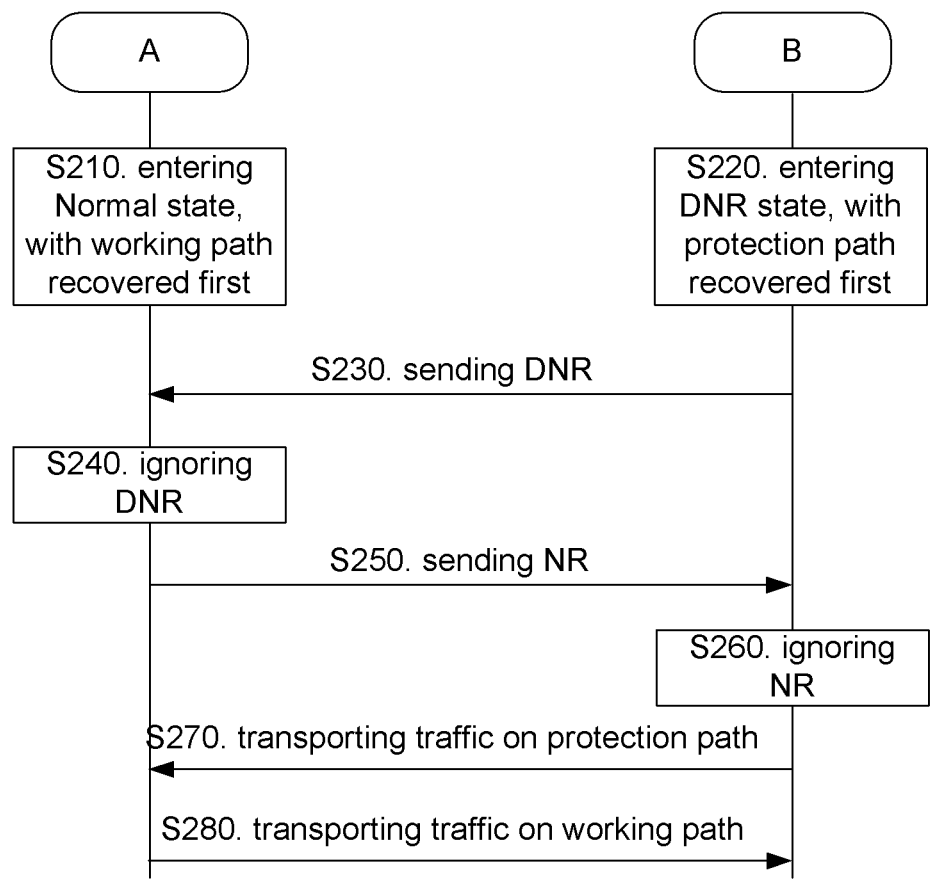
FIG. 2 is a diagram schematically illustrating an example of a procedure performed after a working path and a protection path shown in FIG. 1 revive simultaneously according to the prior art.

FIG. 2 schematically illustrates an example of a procedure performed after a working path and a protection path shown in FIG. 1 revive simultaneously according to the prior art.

As illustrated in FIG. 2, initially, node A has the working path recovered first and enters the Normal state (S210) whereas node B has the protection path recovered first and enters the DNR state (S220). Afterwards, a DNR message is sent from node B to node A (S230), and is ignored by node A (S240). In the opposite direction, an NR message is sent from node A to node B (S250), and is ignored by node B (S260). Without recognizing the inconsistency of their PSC states, nodes A and B maintain their PSC states. Based thereon, node B selects the protection path for transporting traffic to node A (S270), whereas node A selects the working path for transporting traffic to node B (S280).

Figure 3:
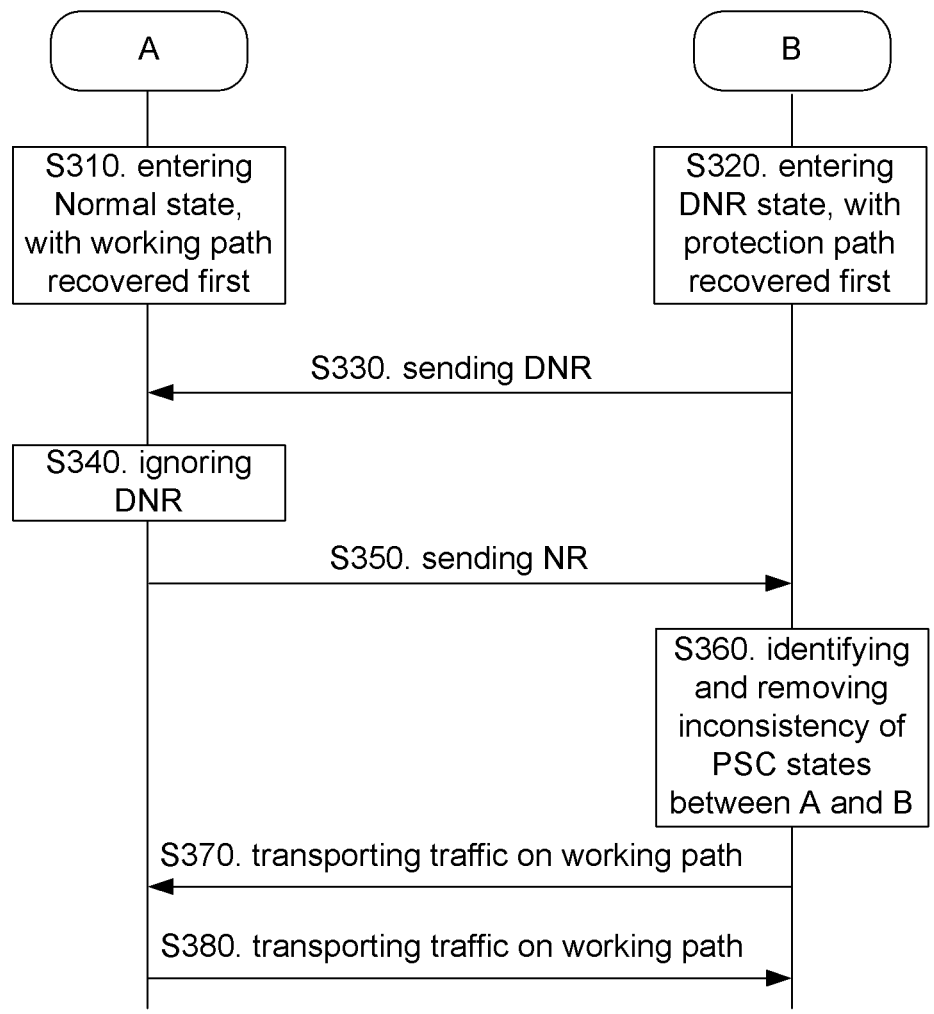
FIG. 3 is a diagram schematically illustrating an example of a procedure performed after the working path and the protection path shown in FIG. 1 revive simultaneously according to the present invention.

For comparison, FIG. 3 schematically illustrates an example of a procedure performed after a working path and a protection path shown in FIG. 1 revive simultaneously according to the present invention.

As the same with the procedure shown in FIG. 2, initially, node A has the working path recovered first and enters the Normal state (S310) whereas node B has the protection path recovered first and enters the DNR state (S320). Afterwards, a DNR message is sent from node B to node A (S330), and is ignored by node A (S340). In the opposite direction, an NR message is sent from node A to node B (S350). As opposed to the procedure shown in FIG. 2, Node B, after receiving the NR message, identifies that its PSC state is inconsistent with the PSC state of node A and removes the inconsistency by changing its PSC state from DNR to Normal (S360). As the PSC state of node B changes to Normal, node B switches the outbound traffic to the working path (S370). Node A maintains its PSC state, and selects the working path for transporting traffic to node B (S380).

As can be seen from the comparison, the procedure according to the present invention does not depart from the framework of the existing PSC protocol, but enables the identification and removal of PSC state inconsistency simply by assigning a remote NR message a higher priority than a local DNR state. Therefore, it can be conveniently and economically implemented and operated on legacy networking devices originally designed for running the existing PSC protocol.

It should be noted that, for the sake of simplicity, the procedures are described above on the assumption that node A has the working path recovered first and enters the Normal state whereas node B has the protection path recovered first and enters the DNR state. However, those skilled in the art would appreciate that the above described procedures still apply if the peer nodes A and B exchange their positions, i.e., if node B has the working path recovered first and enters the Normal state whereas node A has the protection path recovered first and enters the DNR state.

Figure 4:
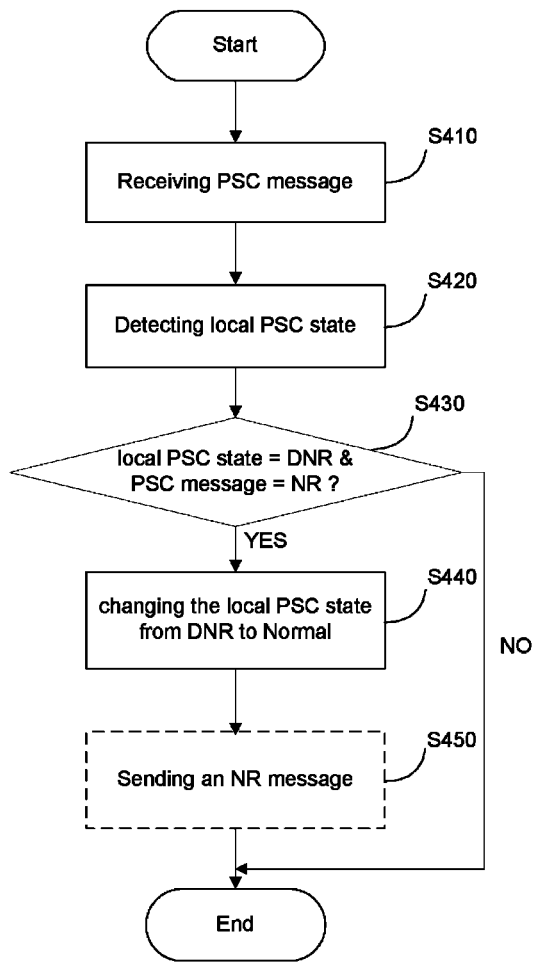
FIG. 4 is a flowchart schematically illustrating operations of a method executed at each end of a communication tunnel for eliminating PSC state inconsistency between two ends of the communication tunnel according to the present invention.

FIG. 4 is a flowchart illustrating operations of a method executed at each end of a communication channel for eliminating PSC state inconsistency between two ends of the communication tunnel according to the present invention.

As illustrated in FIG. 4, after a start of the method, a PSC message is received from the other end (S410) and a local PSC state is detected (S420). Then, it is determined whether the received PSC message is an NR message and the detected local PSC state is a DNR state (S430). If it is determined that the received PSC message is an NR message and the detected local PSC state is a DNR state ('YES' at S430), the local PSC state is changed from the DNR state to a Normal state (S440). After that, an NR message may be sent to the other end (S450), so that the other end can be explicitly informed that the PSC state inconsistency has been removed. Alternatively, the other end can be implicitly informed of the removal of the PSC state inconsistency or may even not be informed about what has happened at its peer end. After step S450, the method is terminated.

If it is determined that the received PSC message is not an NR message or the detected local PSC state is not a DNR state ('NO' at S430), the steps S440 and S450 are bypassed.

With the above-described method performed at node A and node B in FIG. 3, the local PSC state of node B can be changed to Normal whereas node A can stay at the Normal state, so that the PSC state inconsistency between nodes A and B can be eliminated.

Further, based on their respective local PSC states, both of nodes A and B will select the working path for transporting traffic to each other.

Moreover, with the method performed at both of nodes A and B, it is also possible to identify and remove PSC state inconsistency in case node B has the working path recovered first and enters the Normal state whereas node A has the protection path recovered first and enters the DNR state.

In the following, the structure of a networking device 500 according to the present invention will be given with reference to FIG. 5. The networking device 500 may serve as any of two peer ends of a communication tunnel.

Figure 5:
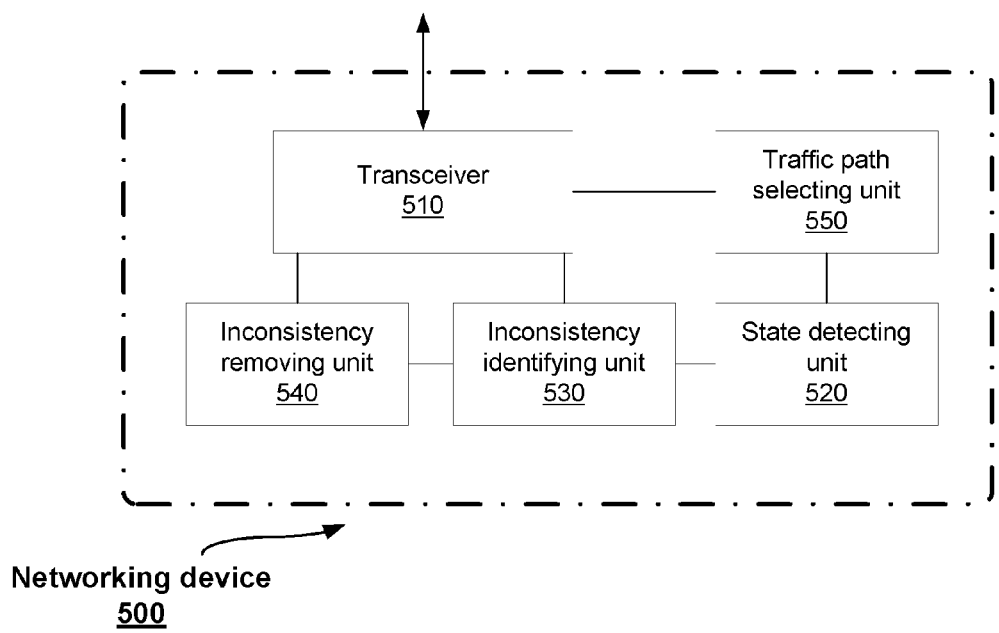
FIG. 5 is a block diagram schematically illustrating an example of a structure of a network device according to the present invention.

As shown in FIG. 5, the networking device 500 comprises a transceiver 510, a state detecting unit 520, an inconsistency identifying unit 530 and an inconsistency removing unit 540. The transceiver 510 is configured to receive a PSC message from another networking device. The state detecting unit 520 is configured to detect a local PSC state of the networking device. The inconsistency identifying unit 530 is configured to determine whether the received PSC message is an NR message and the detected local PSC state is a DNR state. The inconsistency removing unit 540 is configured to change the local PSC state from the DNR state to a Normal state, if the inconsistency identifying unit 530 determines that the received PSC message is an NR message and the detected local PSC state is a DNR state.

Preferably, the networking device 500 may further comprise a traffic path selecting unit 550 configured to select a working path for transporting traffic to the other networking device, if the local PSC state of the networking device is changed to the Normal state.

Preferably, the transceiver 510 may be further configured to send an NR message to the other networking device, if the inconsistency removing unit 540 changes the local PSC state from the DNR state to the Normal state.

Preferably, the inconsistency removing unit 540 may be further configured to maintain the local PSC state, if the inconsistency identifying unit 530 determines that the received PSC message is a DNR message and the detected local PSC state is a normal state.

Some, several or all of the previously described units, i.e., the transceiver 510, the state detecting unit 520, the inconsistency identifying unit 530, the inconsistency removing unit 540 and/or the traffic path selecting unit 550 may, according to some embodiments, be comprised within the same physical unit.

The present invention is described above with reference to the embodiments thereof. However, those embodiments are provided just for illustrative purpose, rather than limiting the present invention. The scope of the invention is defined by the attached claims as well as equivalents thereof. Those skilled in the art can make various alternations and modifications without departing from the scope of the invention, which all fall into the scope of the invention.

REFERENCES

[1] IETF RFC 6378

What is claimed is:

1. A networking device, comprising:
   a transceiver configured to receive a Protection State Coordination (PSC) message from another networking device;
   a state detecting unit configured to detect a local PSC state of the networking device;
   an inconsistency identifying unit configured to determine whether the received PSC message is a No Request (NR) message and the detected local PSC state is a Do-not-Revert (DNR) state;
   an inconsistency removing unit configured to change the local PSC state from the DNR state to a normal state, if the inconsistency identifying unit determines that the received PSC message is an NR message and the detected local PSC state is a DNR state; and
   a traffic path selecting unit configured to transport traffic using a working path instead of a protection path to the other networking device, if the local PSC state of the networking device is changed to the normal state.

2. The networking device according to claim 1, wherein the transceiver is further configured to send an NR message to the other networking device, if the inconsistency removing unit changes the local PSC state from the DNR state to the Normal state.

3. The networking device according to claim 1, wherein the inconsistency removing unit is further configured to maintain the local PSC state, if the inconsistency identifying unit determines that the received PSC message is a DNR message and the detected local PSC state is a normal state.

4. The networking device according to claim 1, wherein the networking device is to have a working path and a protection path to the other networking device, wherein the local PSC state is to be normal when the working path is active, and wherein the local PSC state is to be DNR when the protection path is active.

5. The networking device according to claim 1, wherein when both the working path and the protection path fail, the working path recovers first and the protection path recovers second, the local PSC state is to be set to normal, and wherein when both the working path and the protection path fail, the protection path recovers first and the working path recovers second, the local PSC sate is to be set to DNR.

6. The networking device according to claim 1, wherein the networking device and the other networking device are to be in a multi-protocol label switching transport profile (MPLS-TP) network.

7. The networking device according to claim 6, wherein the networking device and the other networking device are to form a MPLS-TP tunnel.

8. The networking device according to claim 1, wherein the networking device and the other networking device are to be in a 1:1 linear protection group.

9. The networking device according to claim 1, wherein the NR message is to be assigned to a higher priority than the DNR state of the local PSC state.

10. A method in a networking device, comprising:
    receiving a Protection State Coordination (PSC) message from another networking device;
    detecting a local PSC state of the networking device;
    determining whether the received PSC message is a No Request (NR) message and the detected local PSC state is a Do-not-Revert (DNR) state;
    if it is determined that the received PSC message is an NR message and the detected local PSC state is a DNR state,
    changing the local PSC state from the DNR state to a normal state; and
    transporting traffic using a working path instead of a protection path to the other networking device.

11. The method according to claim 10, further comprising:
    sending an NR message to the other networking device, if the local PSC state is changed from the DNR state to the Normal state.

12. The method according to claim 10, further comprising:
    if it is determined that the received PSC message is a DNR message and the detected local PSC state is a normal state, maintaining the local PSC state.

13. The method of claim 10, wherein the networking device has a working path and a protection path to the other networking device, wherein the local PSC state is normal when the working path is active, and wherein the local PSC state is DNR when the protection path is active.

14. The method of claim 10, wherein when both the working path and the protection path fail, the working path recovers first and the protection path recovers second, the local PSC state is set to normal, and wherein when both the working path and the protection path fail, the protection path recovers first and the working path recovers second, the local PSC sate is set to DNR.

15. The method of claim 10, wherein the networking device and the other networking device are in a multi-protocol label switching transport profile (MPLS-TP) network.

16. The method of claim 15, wherein the networking device and the other networking device form a MPLS-TP tunnel.

17. The method of claim 10, wherein the networking device and the other networking device are in a 1:1 linear protection group.

18. The method of claim 10, wherein the NR message is assigned to a higher priority than the DNR state of the local PSC state.

* * * * *